United States Patent
Kunze et al.

[19]

[11] Patent Number: 5,995,331
[45] Date of Patent: Nov. 30, 1999

[54] MAGNETIC-TAPE-CASSETTE APPARATUS

[75] Inventors: Norbert Kunze, Diez; Stefan Koch, Bad Endbach, both of Germany

[73] Assignee: U.S. Philips Corporation, New York, N.Y.

[21] Appl. No.: 08/788,719

[22] Filed: Jan. 23, 1997

[30] Foreign Application Priority Data

Jan. 26, 1996 [DE] Germany .............................. 196 02 740

[51] Int. Cl.$^6$ .............................. G11B 5/54; G11B 15/00; G11B 21/16
[52] U.S. Cl. .......................................... 360/105; 360/96.2
[58] Field of Search .................................. 360/96.2, 105, 360/93, 96.1, 96.5, 137

[56] References Cited

U.S. PATENT DOCUMENTS

| | | | |
|---|---|---|---|
| 5,023,742 | 6/1991 | Kunze ..................................... | 360/96.2 |
| 5,062,014 | 10/1991 | Yoshimura .............................. | 360/96.2 |
| 5,583,719 | 12/1996 | Kunze et al. ........................... | 360/96.2 |

FOREIGN PATENT DOCUMENTS 4404687  8/1995  Germany .

Primary Examiner—William J. Klimowicz
Attorney, Agent, or Firm—Michael E Belk

[57] ABSTRACT

In a tape deck for a magnetic-tape-cassette apparatus, a magnetic head is mounted on a magnetic-head mount in which the magnetic-head mount is arranged on a carrier element mounted on a deck plate and in which the magnetic head is movable in different positions relative to a transport path of a magnetic tape for different modes of operation. The magnetic-head mount is supported on the carrier element so as to be pivotable within given limits and so as to be movable substantially in a direction approximately perpendicular to the transport path of the magnetic tape in such a manner that at the location of the transducing gap the magnetic head is in a substantially parallel alignment relative to the transport path of the magnetic tape in at least two positions.

27 Claims, 5 Drawing Sheets

MAGNETIC-TAPE-CASSETTE APPARATUS

BACKGROUND OF THE INVENTION

The invention relates to a device in a tape deck for a magnetic-tape-cassette apparatus, in which a magnetic head is mounted on a magnetic-head mount, in which the magnetic-head mount is arranged on a carrier element mounted on a deck plate, and in which the magnetic head is movable in different positions relative to a transport path of a magnetic tape for different modes of operation.

Such a device in a tape deck is known from DE 44 04 687 A1. In order to preclude fluctuations in level for different modes of operation, it is desirable that for different modes in different positions the transducing gap of the magnetic head is in substantially parallel alignment with the transport path of the magnetic tape. Parallel alignment of the transducing gap of the magnetic head with the transport path of the magnetic tape is to be understood to mean that at the location of the transducing gap of the magnetic head the magnetic tape is moved past the magnetic head substantially parallel to a tangential plane of the magnetic head face at the location of the transducing gap. This applies particularly to tape decks including a music search system (MSS). In such systems the magnetic head is only in gentle contact with the magnetic tape so as to allow operation in a fast winding mode in which at the same time recording gaps on the magnetic tape can be detected.

In the device described in DE 44 04 687 the magnetic head is mounted on a carrier element which is pivotable about a pivotal axis and which is movable relative to the magnetic tape. By means of this carrier element with its specific movement capability a parallel alignment of the magnetic head in different modes is achieved by arranging the magnetic head on the carrier element so as to be rotatable about the pivotal axis of the element and by guides which always guide the magnetic head perpendicularly to the magnetic tape independently of the pivotal position of the carrier element. Consequently, the only relative movement of the magnetic head with respect to the carrier element is a purely rotary movement.

SUMMARY OF THE INVENTION

Such an arrangement of the magnetic head in conjunction with the guides can be used only in decks including these special carrier elements which are pivotable about a pivotal axis and movable relative to the magnetic tape. Besides, in such a device the movement of the carrier element and the movement of the magnetic head in the direction perpendicular to the transport direction of the magnetic tape are rigidly locked to one another. If the carrier element is also used for the actuation of the pressure-roller mechanism this may readily give rise to tolerance problems of such a kind that in the case of decks including a music search system the pressure roller can erroneously be in contact with the capstan in the music search mode, because in the music search mode the magnetic head should be moved out of the cassette over a limited distance only and, consequently, the pressure roller is also moved away from the capstan over a limited distance only. This holds particularly for carrier elements which are not translated but which are rotated about a fixed center of rotation, in particular for the pressure roller which is disposed nearest to the center of rotation.

It is an object of the present invention to provide a possibility for a device of the type defined in the opening paragraph, with carrier elements which are mounted and movable in a variety of ways, of aligning the magnetic head at the location of the transducing gap in a parallel orientation with respect to the transport path of the magnetic tape in different positions for different modes of operation.

According to the invention this object is achieved in that the magnetic-head mount is supported on the carrier element so as to be pivotable within given limits and so as to be movable substantially in a direction approximately perpendicular to the transport path of the magnetic tape in such a manner that at the location of the transducing gap the magnetic head is in a substantially parallel alignment relative to the transport path of the magnetic tape in at least two positions.

The pivotable and movable mounting of the magnetic-head mount on the carrier element provides a substantial increase of the number of possible movements which can be performed by the magnetic-head mount with respect to the carrier element. The magnetic-head mount can perform radial movements, transverse movements and combined radial/transverse movements with respect to the carrier element. As a result of this greater freedom of movement of the magnetic-head mount relative to the carrier element it becomes possible for carrier elements of various constructions, which perform a variety of movements in a direction towards the transport path of the magnetic tape, to achieve a parallel alignment of the magnetic head with respect to the transport path of the magnetic tape at the location of the transducing gap in at least two positions.

Owing to the movable arrangement of the magnetic-head mount it is possible to isolate the movement of the carrier element from the movement of the magnetic head in given ranges. It is to be noted that "pivotable" is to be understood to include all movements leading to this alignment, even those where there is no real pivot.

An advantageous embodiment of the invention is characterized in that the parallel alignment of the magnetic head relative to the transport path of the magnetic tape at the location of the transducing gap in a first position is achieved in that first reference elements are arranged on the deck plate, positioning elements arranged on the magnetic-head mount being urged against the reference elements.

The alignment of the magnetic head with respect to reference elements which are fixedly arranged on the deck plate results in a very high alignment accuracy. In particular, this alignment in the first position is independent of the orientation of the carrier element in the first position, which exhibits inevitable tolerances.

Another advantageous embodiment is characterized in that the carrier element includes guide pins which engage in slots in the magnetic-head mount, or the carrier element has slots in which the guide pins of the magnetic-head mount engage.

The implementation of the pivotable and movable arrangement of the magnetic-head mount on the carrier element by means of guide pins engaging in slots is cheap and simple. In this respect it is envisaged particularly to use two slots which cooperate with two guide pins.

A further advantageous embodiment of the invention is characterized in that the carrier element and the magnetic-head mount are restrained relative to one another by means of restraining forces.

These restraining forces enable the magnetic-head mount to be held in a fixed position although the guide pins and slots do not act upon one another. In this embodiment it is advantageous if restraining is effected by means of a spring which, while being braced against the carrier element, subjects the magnetic-head mount essentially to force in a direction approximately perpendicular to the transport path of the magnetic tape.

Restraining by means of a spring is very simple to realize. Owing to the spring load of the magnetic-head mount in a direction towards the transport path of the magnetic tape the magnetic-head mount can be urged against elements of the deck plate, for example the first reference elements, without the guide pins exerting a significant force on the edges of the slots in a direction perpendicular to the transport path of the magnetic tape.

A further advantageous variant of this embodiment is characterized in that the parallel alignment of the magnetic head relative to the transport path of the magnetic tape at the location of the transducing gap in a second position is achieved in that end walls of the slots in the magnetic-head mount are urged against the guide pins of the carrier element as a result of the restraint between the carrier element and the magnetic-head mount.

In this second position the parallel alignment of the magnetic head is defined by the orientation of the carrier element in this second position or by the guide pins mounted on the carrier element, against which the end walls of the slots in the magnetic-head mount are urged.

In a further embodiment of the invention a guidance of the magnetic-head mount in the height direction relative to the deck plate in the first and the second position is obtained by the cooperation of the positioning elements arranged on the magnetic-head mount and the first reference elements arranged on the deck plate.

A height alignment by means of the reference elements disposed on the deck plate can be realized with a very high accuracy. Thus, it possible, for example, that the positioning elements arranged on the magnetic-head mount take the form of locating slots and the first reference elements take the form of pins which engage the locating slots.

A further advantageous embodiment of the invention is characterized in that the parallel alignment of the magnetic head relative to the transport path of the magnetic tape at the location of the transducing gap in a first position is achieved in that the positioning elements arranged on the magnetic-head mount are urged against the first reference elements arranged on the deck plate by means of the restraining forces between the carrier element and the magnetic-head mount, the guide pins arranged on the carrier element and engaging the slots in the magnetic-head mount being clear of the end walls of the slots in the magnetic-head mount.

Since the restraining forces urge the magnetic-head mount against the reference elements with its positioning elements, the guide pins of the carrier element need not exert a force on the magnetic-head mount in a direction towards the first reference elements by acting upon the end walls of the slots. Thus, it becomes possible for the guide pins of the carrier element and hence for the carrier element itself to move freely within the confines of the slots of the magnetic-head mount without the magnetic-head mount and the magnetic head being moved out of the first position. This construction is particularly advantageous for use in tape decks having a music search system. In such system it is desired that in the music search mode the magnetic head is moved away from the position of the magnetic head in the play mode over a very small distance only, in such a manner that the magnetic head contacts the tape only gently and recording gaps on the magnetic tape can still be detected. However, at the same time it is necessary in such a system that pressure rollers which are pressed against the associated capstans in the play mode are withdrawn far enough from the capstans in the music search mode. Since in many tape decks the pressure rollers are disposed on the carrier element or are controlled by the movement of the carrier element it is often a problem to obtain a sufficiently small withdrawal of the magnetic head from the magnetic tape and at the same time a sufficiently large withdrawal of the pressure roller from the capstan for operation in the music search mode. The embodiment of the invention enables the pins disposed in the carrier element and, as consequence, the carrier element itself are withdrawn over a larger distance than the magnetic-head mount and the magnetic head when changing over from a normal play mode to operation in the music search mode. Whereas the magnetic-head mount and the magnetic head are moved back only over the small distance required for withdrawal from the tape, the guide pins on the carrier element and the carrier element can be moved back over an additional distance equal to the longitudinal dimensions of the slots of the magnetic-head mount and thereby assure an adequate withdrawal of the pressure rollers from the capstans. In this way the movement of the carrier element and the pressure rollers is isolated from the movement of the magnetic head.

A further advantageous embodiment of the invention is characterized in that the magnetic head is in parallel alignment relative to the transport path of the magnetic tape in a third position and this parallel alignment in the third position is determined by a second reference element arranged on the deck plate and by at least one guide pin of the carrier element, against which an end wall of a slot in the magnetic-head mount is urged.

A further advantageous embodiment of the invention is characterized in that the carrier element is pivotable about a pivot disposed at the periphery of the deck plate and the slots in the magnetic-head mount have different lengths.

The magnetic head and the magnetic-head mount are moved from the play position into the position for music search and fast winding by rotating the carrier element about the pivot which is situated at the periphery of the deck plate. The guide pins disposed on the carrier element, which are situated at different distances from the pivot, then follow paths of different lengths. To compensate for these different pathlengths and to enable a parallel alignment of the magnetic-head mount and the magnetic head relative to the transport path of the magnetic tape to be obtained, the slots of the magnetic-head mount have been given different lengths.

A further advantageous embodiment of the invention is characterized in that during the pivotal movement of the carrier element in the third position the magnetic-head mount performs a pivotal movement opposed to the pivotal movement of the carrier element as a result of the action of the second reference element arranged on the deck plate upon an actuating arm of the magnetic-head mount.

This third position is particularly suitable for use in a standby mode or as an eject position. For this operating position the magnetic-head mount and the magnetic head should be completely outside the working area of the magnetic-tape cassette to enable this cassette to be removed from the magnetic-tape-cassette apparatus. A carrier element having a pivot situated at the periphery of the deck plate now also has the problem that, when the carrier element is rotated from the first or the second position into the third position, the areas of the magnetic head and the magnetic-head mount which are situated at the side facing the pivot of the carrier element are moved away from the transport path of the magnetic tape over a smaller distance than the areas of the magnetic head and the magnetic-head mount which are situated at the side which is remote from the pivot of the carrier element. In order to compensate for this difference in distance from the transport path of the magnetic tape the magnetic-head mount performs a pivotal movement opposed to the rotary movement of the carrier element in that the second reference element disposed on the deck plate acts upon the actuating arm of the magnetic head mount. This also ensures a parallel alignment of the magnetic head and the magnetic-head mount relative to the transport path of the magnetic tape at the location of the transducing gap in the third position.

It is advantageous if the first position is used for the "normal play" mode (Play), the second position is used for the "fast winding" or "music search" (MSS) mode, and the third position is used for the "stand-by" mode (Stand-By) or the "eject" mode (Eject).

Those skilled in the art will understand the invention and additional objects and advantages of the invention by studying the description of preferred embodiments below with reference to the following drawings which illustrate the features of the appended claims An embodiment of the invention will be described in more detail hereinafter with reference to FIGS. 1 to 6 of the drawings. In the drawings:

DESCRIPTION OF THE PREFERRED EMBODIMENTS

Figure 1:
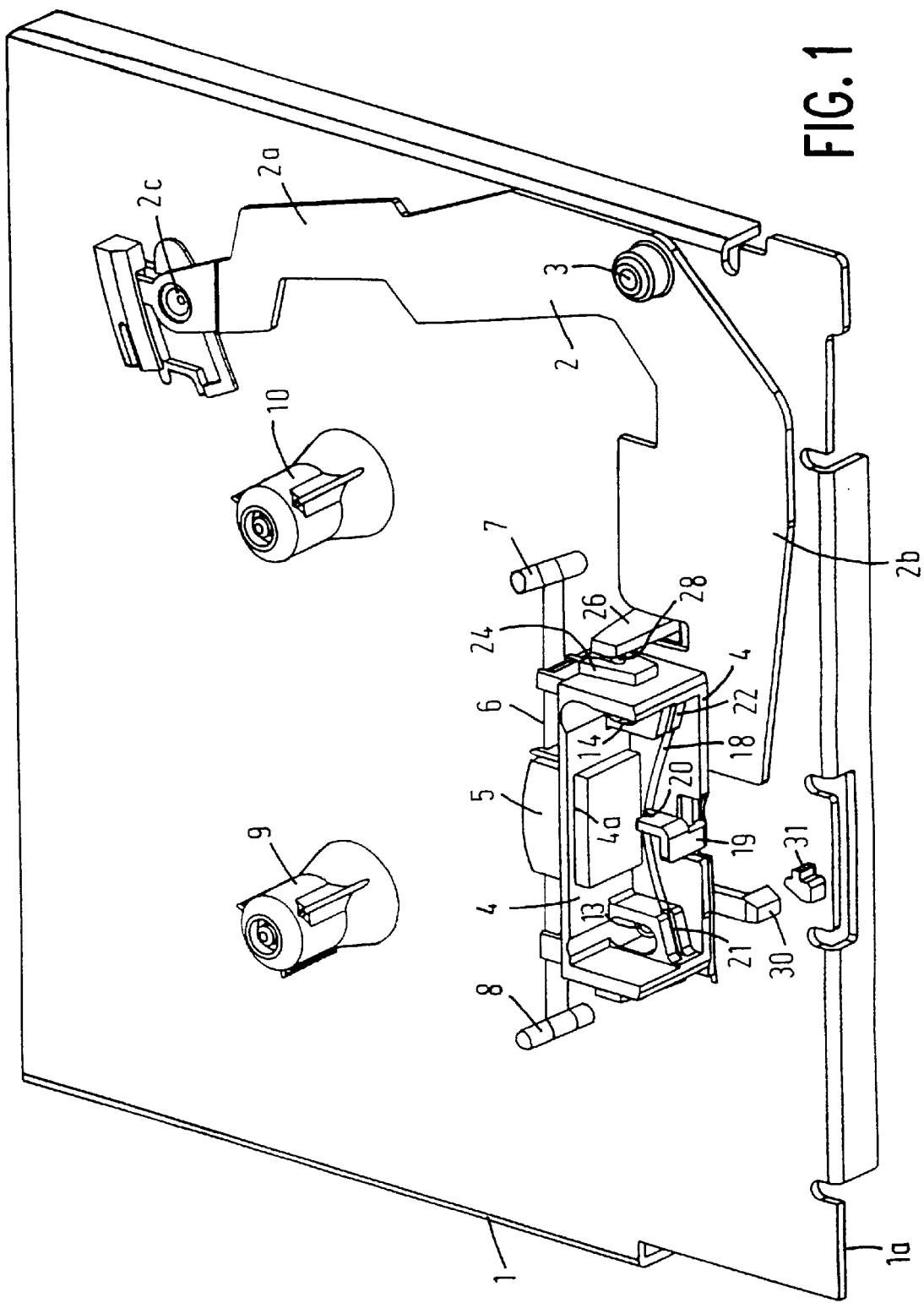
FIG. 1 is a perspective view of parts of a tape deck of a magnetic-tape-cassette apparatus including a magnetic head mounted in a magnetic head mount, the magnetic-head mount being arranged on a carrier element which is rotatably mounted on a deck plate and the tape deck being shown in a play position.

As is shown in FIG. 1, the tape deck in accordance with the invention includes a deck plate 1 on whose periphery a carrier element 2 is mounted so as to be rotatable about a pivot 3. The carrier element 2 has two limbs 2a and 2b and a guide pin 2c on the end of the limb 2a. This guide pin 2c engages a control of a control disc, not shown, which exerts the forces required for pivoting the carrier element 2 on the guide in 2c. A magnetic-head mount 4 is supported on the carrier element 2 in a "floating" manner and has an opening 4a in which a magnetic head 5 is secured, for example by means of an adhesive or by clamping. The magnetic head 5 and the magnetic-head mount 4 can be moved towards a transport path of a magnetic tape 6 by turning the carrier element 2 about the pivot 3. For the transport of the magnetic tape 6 there have been provided two capstans 7 and 8, to which associated pressure rollers, not shown, can be applied. In addition, the deck plate 1 carries two reel discs 9 and 10, which are engageable in winding holes, not shown, of a magnetic-tape cassette, not shown.

Figure 2:
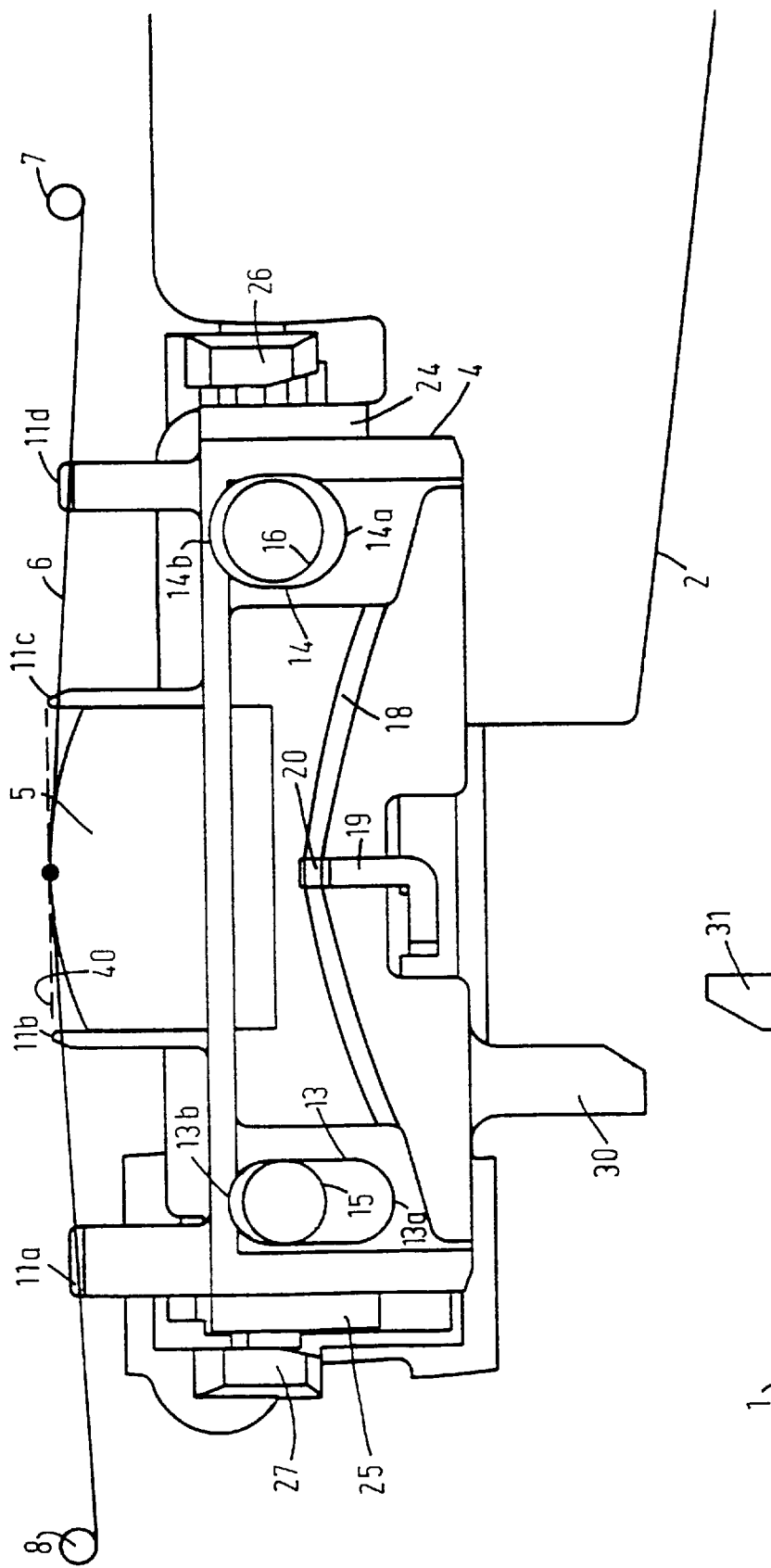
FIG. 2 is a plan view of parts of the tape deck with the magnetic head, the magnetic-head mount and the carrier element being shown in the play position of FIG. 1.

In the position shown in FIG. 1 the tape deck is the normal play mode. FIG. 2 is a plan view showing the magnetic head 5, the magnetic-head mount 4 and parts of the carrier element 2 in this play position. The magnetic-head mount 4 includes four projecting tape guide elements 11a, 11b, 11c and 11d which define the transport path of the magnetic tape 6. The magnetic-head mount 4 is mounted on the carrier element 2 so as to be "floating", i.e. there is no rigid connection between the magnetic-head mount 4 and the carrier element 2. For this purpose the magnetic-head mount 4 has two slots 13 and 14 of different lengths, which extend towards the transport path of the magnetic tape 6. These slots 13 and 14 are engaged by guide pins 15 and 16 arranged on the carrier element 2. These guide pins 15 and 16, which engage in the slots 13 and 14, define a lateral guidance of the magnetic-head mount 4 relative to the carrier element 2. A translatory movement or a pivotal movement of the magnetic-head mount 4 with respect to the carrier element 2 is possible within the confines of the slots 13 and 14. The carrier element 2 and the magnetic-head mount 4 are restrained with respect to one another by means of a wire spring 18. In its center this wire spring 18 engages a groove 20 in a supporting element 19 and at its two ends it is urged into grooves 21 and 22 in the magnetic-head mount 4 while being braced against this supporting element 19. At the ends of the magnetic-head mount 4 positioning elements 24 and 25 are disposed, which take the form of locating profiles which are open at one end. These positioning elements 24 and 25 cooperate with first reference elements 26 and 27 which are fixedly mounted on the deck plate 1. The first reference elements 26 and 27 have laterally projecting noses 28 and 29, which are engageable in the locating profiles, which form the positioning elements 24 and 25. The construction of the positioning elements 24 and 25 and of the first reference elements 26 and 27 is apparent from the side view in FIG. 5. At its side which faces the magnetic head 5 the magnetic-head mount 4 includes an actuating arm 30, which lies on the deck plate 1 so as to be freely movable. A second reference element 31 is fixedly mounted on the deck plate 1 at the location of its front side 1a.

Figure 5:
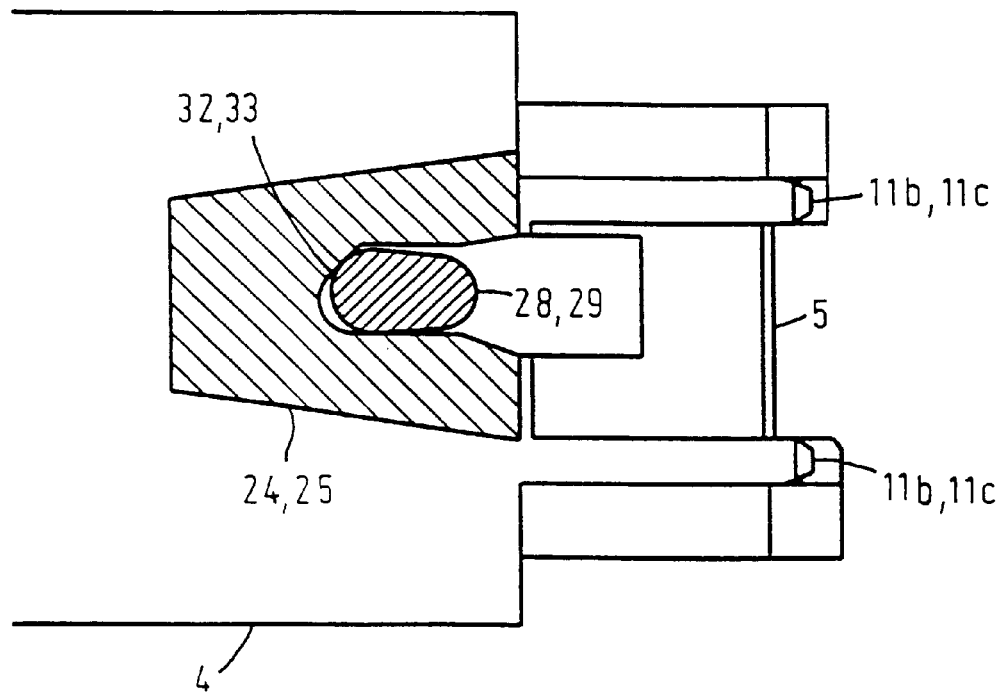
FIG. 5 is a side view of a part of the magnetic-head mount with positioning elements which are disposed on the magnetic-head mount and which cooperate with reference elements disposed on the deck plate being shown in the play position.

First of all, the operation in play mode shown in FIGS. 1, 2 and 5 will be explained. In this play position the wire spring 18 urges the positioning elements 24 and 25 of the magnetic-head mount 4 against the noses 29 and 29 of the first reference elements 26 and 27 while being braced against the supporting element 19. At their open ends the locating profiles forming the positioning elements 24 and 25 have positioning slopes 31 and 32. In the play position, as can be seen in FIG. 5, the noses 28 and 29 of the first reference elements 26 and 27 press against these positioning slopes 31 and 32, which results in wedging and, consequently, a play-free positioning of the magnetic-head mount 4 relative to the first reference elements 26 and 27 and thus also relative to the deck plate 1. Thus, the first reference elements 26 and 27 define two reference points for the magnetic-head mount 4 in the play position. The actuating arm 30 disposed on the deck plate defines a third reference point. The wire spring 18 is situated at a lower level with respect to the deck plate 1 than the noses 28 and 29 of the first reference elements 26 and 27. As a result, the magnetic-head mount 4 is subjected to a torque directed towards the deck plate 1, which is taken up by the actuating arm 30 which lies on the deck plate 1. The guide pins 15 and 16, which are carried by the carrier element 2 and which engage in the slots 13 and 14 of the magnetic-head mount 4, have no influence on the position of the magnetic-head mount 4 in the play mode. In the play position they are disposed in such a manner that they are clear of the end walls 13a, 13b and 14a, 14b of the slots 13 and 14, respectively. Thus, in the play mode the positions of the magnetic-head mount 4 and the magnetic head 5 are referred exclusively to the deck plate 1 and to the noses 28 and 29 of the first reference elements 26 and 27, which are fixedly mounted on the deck plate 1, and not to the carrier element 2. This makes it possible to achieve a very high positioning accuracy of the magnetic-head mount 4 and the magnetic head 5 as regards the penetration depth into the magnetic-tape cassette, not shown, as regards the height relative to the deck plate 1, and as regards the angular position relative to the magnetic tape 6.

In the play mode the magnetic head 5 is in a substantially parallel alignment with respect to the transport path of the magnetic tape 6 at the location of the transducing gap. This is to be understood to mean that at the location of the transducing gap of the magnetic head 5 the magnetic tape 6 moves substantially parallel to a tangential plane 40 of the magnetic head face at the location of the transducing gap.

Figure 3:
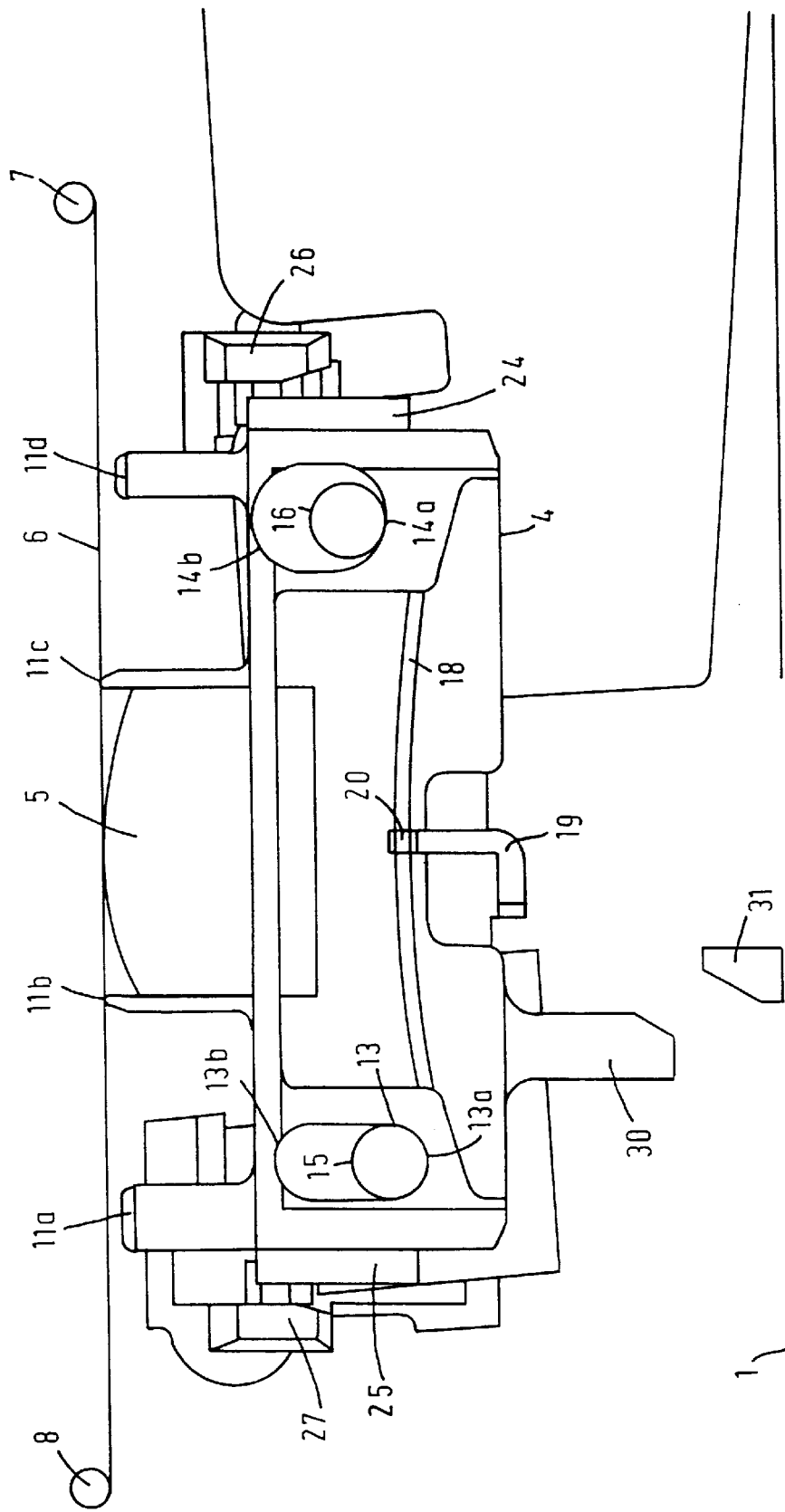
FIG. 3 is a plan view of parts of the tape deck with the magnetic head, the magnetic-head mount and the carrier element being in a fast-winding or music search (MSS) position.
Figure 6:
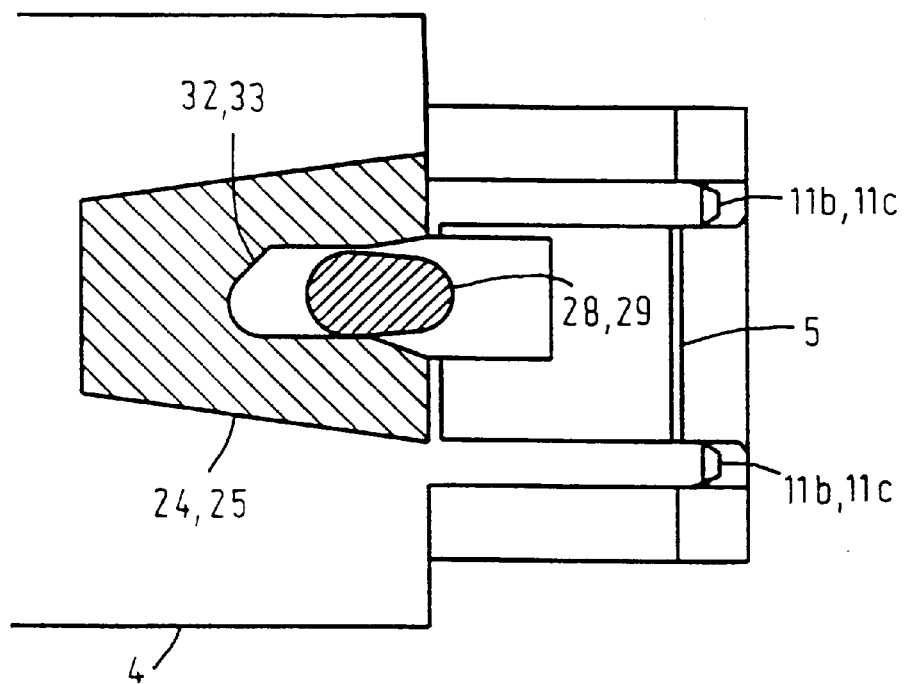
FIG. 6 is a side view of a part of the magnetic-head mount with positioning elements which are disposed on the magnetic-head mount and which cooperate with reference elements disposed on the deck plate being shown in the fast-winding or music-search position.

Now the change-over from the play mode to the "fast winding" mode or "music search" mode (MSS), hereinafter referred to as MSS position, will be described with reference to the plan view in FIG. 3 and the side view in FIG. 6.

If the tape deck should be set from the play position to the MSS position the carrier element 2 is pivoted counter-clockwise about the pivot 3 and is thus moved away from the transport path of the magnetic tape 6. In a first angular range of this pivotal movement the magnetic-head mount 4 and the magnetic head 5 remain in their play positions. Initially, they are not moved because the wire spring 18 urges the positioning elements 24 and 25 further against the noses 28 and 29 of the first reference elements 26 and 27. The pivotal movement of the carrier element 2 does not influence the position of the magnetic-head mount 4 and of the magnetic head 5 until the pivoting angle of the carrier element 2 has become so large that the right-hand guide pin 16 is urged against the end wall 14a of the slot 14. As a result of the different lengths of the slots 13 and 14 the right-hand guide pin 16 is first urged against the end wall 14a of the slot 14. As a result of this, the magnetic-head mount 4 and the magnetic head 5 assume oblique positions. As the carrier element 2 is pivoted further the left-hand guide pin 15 of the carrier element 2 is pressed against the end wall 13a of the slot 13. The different lengths of the slots 13 and 14 have been proportioned in such a manner that the magnetic-head mount 4 with the magnetic head 5 is again disposed parallel to the transport path of the magnetic tape 6 when the carrier element 2 has been pivoted wholly into the MSS position. In this MSS position the end walls 13a and 14a of the slots 13 and 14 are urged against the guide pins 15 and 16 of the carrier element 2. As a result of the different lengths of the slots 13 and 14 it is achieved that the magnetic-head mount 4 and the magnetic head 5 extend parallel to the transport path of the magnetic tape 6 in the MSS mode, although the carrier element 2 has been pivoted with respect to the play position. In the MSS mode, as is apparent from FIG. 6, the positioning elements 24 and 25 arranged on the magnetic-head mount 4 are still guided in the height direction by the noses 28 and 29 of the first reference elements 26 and 27. The guide pins 15 and 16 of the carrier element 2 merely determine the parallel alignment of the magnetic-head mount 4 and the magnetic head 5 with respect to the transport path of the magnetic tape 6. This parallel alignment of the magnetic-head mount 4 and the magnetic head 5 with respect to the transport path of the magnetic tape 6 in the MSS mode guarantees a highly reliable operation in the MSS mode. When the tape deck is set from the play mode to the MSS mode the fixed guide pins 15 and 16 on the carrier element 2 cover a larger distance than the magnetic-head mount 4 and the magnetic head 5 because, as already described above, the magnetic-head mount 4 and the magnetic head 5 are not yet moved along in a first angular range of the carrier element 2. By means of such a construction the following problem can be solved. In the music search position the magnetic head should only be moved over a very small distance with respect to the play position, in such a manner that the magnetic head 5 contacts the magnetic tape 6 only gently and recording gaps on the magnetic tape 6 can still be detected. However, at the same time it is necessary that the pressure roller which is active in the play mode is so far withdrawn from the associated capstan 7 or 8 that the magnetic tape 6 can be moved freely between the capstans 7 and 8 and the associated pressure rollers by means of the reel disc s 9 and 10. Since the pressure rollers are frequently mounted on the carrier element 2 it is often problematic to guarantee an adequate withdrawal of the relevant pressure roller from the associated capstan in the MSS mode. In the case of the present carrier element particularly the withdrawal of the right-hand pressure roller from the right-hand capstan 7 is critical because this capstan 7 is situated in the proximity of the pivot 3 of the carrier element 2 and when the carrier element 2 is pivoted from the play position into the MSS position a pressure roller mounted on the carrier element 2 performs only a small travel. In the tape deck in accordance with the invention, as described, the carrier element 2 can perform a larger travel than the magnetic head 5 and the magnetic-head mount 4 during the change-over from the play mode to the MSS mode, as a result of which an adequate withdrawal of a pressure roller, not shown, mounted on the carrier element 2 can be guaranteed.

Figure 4:
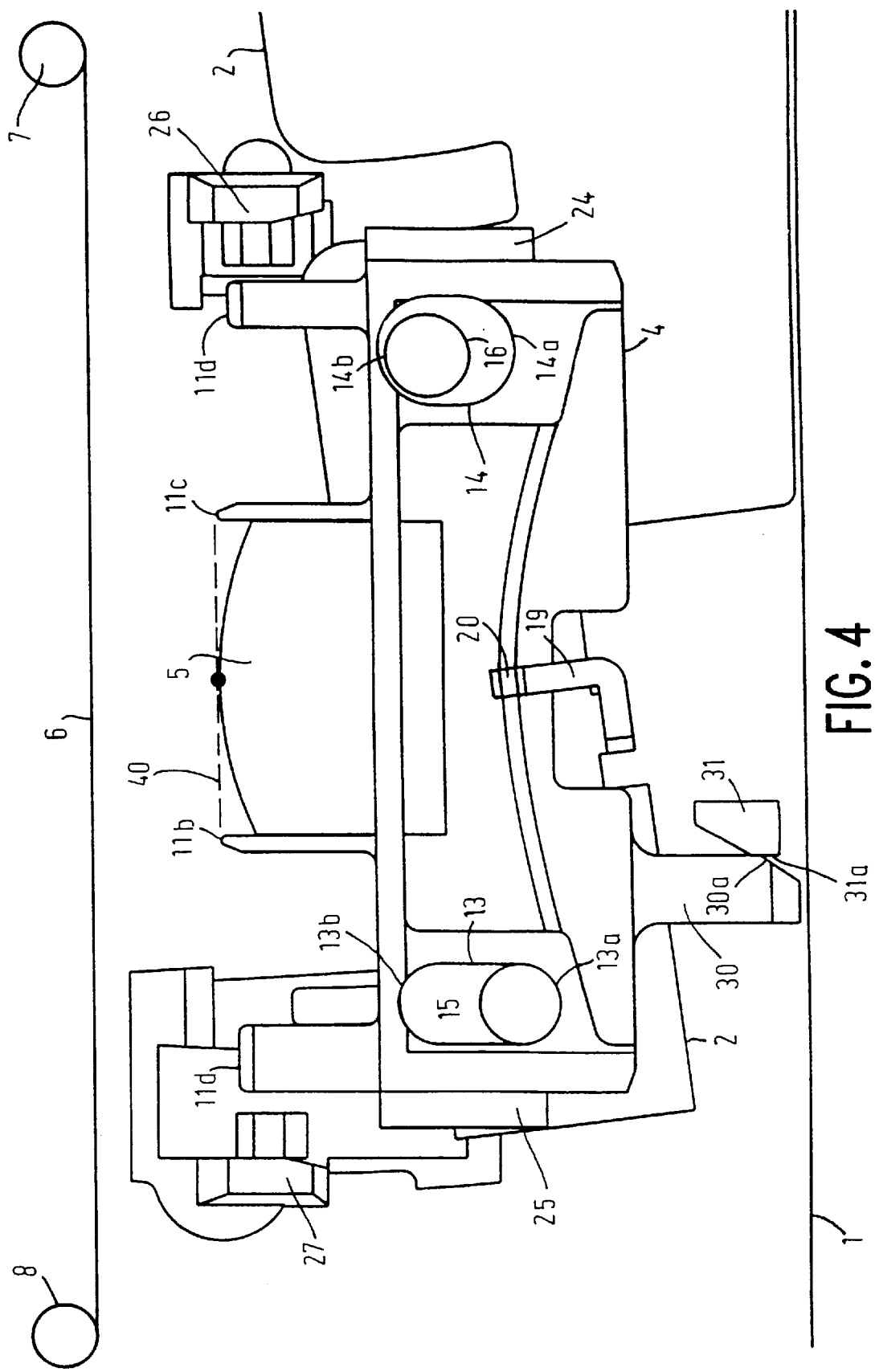
FIG. 4 is a plan view of parts of the tape deck with the magnetic head, the magnetic-head mount and the carrier element being shown in an eject or standby position.

If the tape deck should now be set to a standby position, which is identical to an eject position and which is shown in plan view in FIG. 4, the carrier element 2 is pivoted further counter-clockwise about the pivot 3. The magnetic head 5 and the magnetic-head mount 4 are moved along during this pivotal movement of the carrier element 2 in that the guide pins 15 and 16 are urged against the end walls 13a and 14a of the slots 13 and 14. The magnetic head 5 and the magnetic-head mount 4 then initially again assume an oblique position relative to the transport path of the magnetic tape 6. As the carrier element 2 is pivoted further the actuating arm 30 of the magnetic-head mount 4 is pressed against the second reference element 31 secured to the deck plate 1, as a result of which the magnetic-head mount 4 and the magnetic head 5 are pivoted clockwise. In the standby or eject position, shown in plan view in FIG. 4, the right-hand side 30a of the actuating arm 30 is urged against the left-hand side 31a of the second reference element 31. Thus, it is achieved that in the standby or eject position the magnetic-head mount 4 and the magnetic head 5 are also in a parallel alignment relative to the transport path of the magnetic tape 6.

In the standby or eject position the magnetic-head mount 4 and the magnetic head 5 should be fully withdrawn from the magnetic-tape cassette, not shown, in order to enable the magnetic-tape cassette to be removed from the tape deck. Since the pivot 3 of the carrier element 2 is situated at the periphery of the deck plate 1, the problem arises that during the pivotal movement of the carrier element 2 the left-hand side of the magnetic-head mount with the tape guide elements 11a and 11b leaves the magnetic-tape cassette sooner than the right-hand part of the magnetic-head mount 4 carrying the tape guide elements 11c and 11d and facing the pivot 3. This problem is solved by the clockwise pivotal movement of the magnetic head 5 and the magnetic-head mount 4 with respect to the carrier element 2 as a result of the action of the second reference element 31 upon the actuating arm 30. Thus, the pivoting angle required for a complete withdrawal of the magnetic-head mount 4 and the magnetic head 5 from the magnetic-tape cassette is reduced by the described parallel alignment of the magnetic-head mount 4 and the magnetic head 5 in the standby or eject mode, because the "critical" tape guide elements 11c and 11d experience an additional clockwise rotation out of the magnetic-tape cassette during the parallel alignment of the magnetic-head mount 4.

The present invention provides a novel solution to arrange a magnetic head supported in a magnetic-head mount on a carrier element. The "floating" arrangement in accordance with the invention enables the magnetic head and the magnetic-head mount to be aligned in the desired manner relative to the transport path of the magnetic tape in different modes of operation, particularly in the play, MSS and eject modes. The "floating" arrangement in accordance with the invention is not limited to the carrier element 2 used in the embodiment described by way of example, which element is journaled about the pivot 3 at the periphery of the deck plate 1. This "floating" arrangement rather enables a parallel alignment of the magnetic-head mount and the magnetic head relative to the transport path of the magnetic tape to be realized in different positions for a variety of differently supported and movable carrier elements. Besides, the movable arrangement of the magnetic-head mount enables the movement of the carrier element to be isolated from the movement of the magnetic head.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. A device in a tape deck for a magnetic-tape-cassette apparatus, in which a magnetic-head is mounted on a magnetic-head mount, in which the magnetic-head mount is arranged on a carrier element mounted on a deck plate, and in which the magnetic-head is translationally movable in different positions relative to a transport path of a magnetic tape for different modes of operation, in which the magnetic-head mount is supported on the carrier element so as to be pivotable within given limits with respect to the carrier element and so as to be translationally movable with respect to the carrier element substantially in a direction approximately perpendicular to the transport path of the magnetic tape in such a manner that at the location of a transducing gap the magnetic-head is in a substantially parallel alignment relative to the transport path of the magnetic tape in at least two positions.

2. The device of claim 1, in which in a plane parallel to the deck plate, the parallel alignment of the magnetic-head relative to the transport path of the magnetic tape at the location of the transducing gap in a first position is achieved in which first reference elements are arranged on the deck plate, positioning elements arranged on the magnetic-head mount being urged against the reference elements.

3. The device of claim 2, in which a guidance of the magnetic-head mount in the height direction relative to the deck plate in a first and a second position is obtained by the cooperation of the positioning elements arranged on the magnetic-head mount and first reference elements arranged on the deck plate.

4. The device of claim 2, in which the first position is used for the "normal play" mode, a second position is used for the "fast winding" or "music search" mode, and a third position is used for the "stand-by" mode or the "eject" mode.

5. The device of claim 1, in which the carrier element has guide pins which engage in slots in the magnetic-head mount, or the carrier element has slots in which guide pins of the magnetic-head mount engage.

6. The device of claim 1, in which the carrier element and the magnetic-head mount are restrained relative to one another by restraining forces.

7. The device of claim 6, in which restraining is effected by means of a spring which, while being braced against the carrier element, subjects the magnetic-head mount essentially to force in a direction approximately perpendicular to the transport path of the magnetic tape.

8. The device of claim 6, in which the parallel alignment of the magnetic-head relative to the transport path of the magnetic tape at the location of the transducing gap in a second position is achieved in which end walls of slots in the magnetic-head mount are urged against guide pins of the carrier element as a result of the restraint between the carrier element and the magnetic-head mount.

9. The device of claim 6, in which the parallel alignment of the magnetic-head relative to the transport path of the magnetic tape at the location of the transducing gap in a first position is achieved in which positioning elements arranged on the magnetic-head mount are urged against first reference elements arranged on the deck plate by means of the restraining forces between the carrier element and the magnetic-head mount, guide pins arranged on the carrier element and engaging slots in the magnetic-head mount being clear of end walls of the slots in the magnetic-head mount.

10. The device of claim 1, in which the magnetic-head is in parallel alignment relative to the transport path of the magnetic tape in a third position and this parallel alignment in the third position is determined by a second reference element arranged on the deck plate, against which an activating arm of the magnetic-head mount is urged, and by at least one guide pin of the carrier element, against which an end wall of a slot in the magnetic-head mount is urged.

11. The device of claim 1, in which the carrier element is pivotable about a pivot disposed at the periphery of the deck plate and slots in the magnetic-head mount have different lengths.

12. The device of claim 11, in which during the pivotal movement of the carrier element in a third position, the magnetic-head mount performs a pivotal movement opposed to the pivotal movement of the carrier element as a result of the action of a second reference element arranged on the deck plate upon an actuating arm of the magnetic-head mount.

13. A tape deck comprising the device as claimed in claim 1.

14. A magnetic-tape-cassette apparatus including a tape deck, comprising the device as claimed in claim 1.

15. A device for positioning a magnetic-head relative to a transport path of a magnetic tape, comprising:

a deck plate fixed in relation to the transport path of the magnetic tape;

a carrier element mounted on the deck plate to pivot in relation to the deck plate; and a magnetic-head mount supported on the carrier element, pivotable within given limits and translationally movable in a direction approximately perpendicular to the transport path of the magnetic tape, relative to the carrier element, to move the magnetic-head into different positions relative to the transport path, in such a manner that at the location of a transducing gap a magnetic-head mounted on the magnetic-head mount would be aligned approximately parallel to the transport path in at least two different positions of the magnetic-head.

16. The device of claim 15, in which:

the deck plate includes first reference elements fixed to the deck plate;

the magnetic-head mount includes positioning elements fixed to the magnetic-head mount; and the device further comprises means for urging the positioning elements against the first reference elements for maintaining in a first magnetic-head position, the parallel alignment of the magnetic-head relative to the transport path of the magnetic tape at the location of the transducing gap in a plane parallel to the deck plate.

17. The device of claim 16, in which the means for urging the positioning elements against the first reference elements is adapted for maintaining in a second magnetic-head position, the parallel alignment of the magnetic-head relative to the transport path of the magnetic tape at the location of the transducing gap in a plane parallel to the deck plate.

18. The device of claim 15, in which the magnetic-head mount has slots and the carrier element has guide pins which engage in the slots in the magnetic-head mount.

19. The device of claim 18, in which the first position of the magnetic-head is used for the "normal play" mode, a second position of the magnetic-head is used for a "fast winding" or "music search" mode, and a third position of the magnetic-head is used for a "stand-by" or "eject" mode of the device.

20. The device of claim 15, in which the magnetic-head mount has guide pins and the carrier element has slots in which the guide pins of the magnetic-head mount engage.

21. The device of claim 15, further comprising means for biasing the magnetic-head mount relative to the carrier element.

22. The device of claim 21, in which the means for biasing include a spring which is braced between the magnetic-head mount and the carrier element and subjects the magnetic-head mount essentially to force in a direction approximately perpendicular to the transport path of the magnetic tape.

23. The device of claim 21, in which the magnetic-head mount includes slots with end walls and the carrier element includes guide pins engaged in the slots and the means for biasing is adapted for urging the pins against the end walls of the slots in a second magnetic-head position to provide parallel alignment of the magnetic-head relative to the transport path of the magnetic tape at the location of the transducing gap in the second position.

24. The device of claim 21, in which:

the deck plate includes first reference elements;

the carrier element includes guide pins;

the magnetic-head mount includes slots with end walls into which the guide pins are inserted and positioning elements; and the means for biasing are adapted to urge the first reference elements against the positioning elements for providing the parallel alignment of the magnetic-head relative to the transport path of the magnetic tape at the location of the transducing gap in a first magnetic-head position in which the guide pins are clear of end walls of the slots in the magnetic-head mount.

25. The device of claim 15, in which:

the deck plate includes a second reference element;

the carrier element includes at least one guide pin;

the magnetic-head mount includes a slot with an end wall and an actuating arm; and the device further comprises biasing means for urging the guide pin against the end wall of the slot in the magnetic-head mount and for urging the actuating arm against the second reference element to maintain the magnetic-head in parallel alignment relative to the transport path of the magnetic tape in a third magnetic-head position.

26. The device of claim 15, in which the deck plate includes at its periphery, a pivot connected to the carrier element about which the carrier element pivots and the magnetic-head includes slots which have different lengths.

27. The device of claim 26, in which:

the magnetic-head mount includes an actuating arm;

the deck plate includes a second reference element;

and the device includes means for pivoting the carrier element into a third position including pivoting the magnetic-head mount relative the carrier element and pivoting the carrier element in the opposite direction as a result of the interaction of a second reference element with the actuating arm of the magnetic-head mount.

* * * * *